Figure 1:
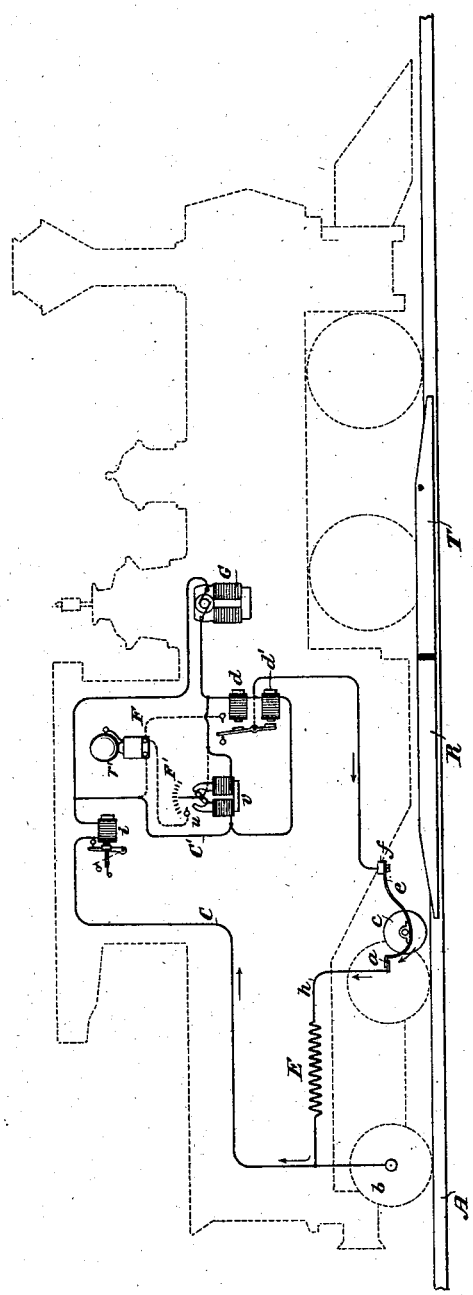

No. 721,161. PATENTED FEB. 24, 1903.
E. B. CUTTEN & A. C. FRASER.
ELECTRIC SIGNAL FOR RAILWAYS.
APPLICATION FILED FEB. 6, 1891.
NO MODEL. 4 SHEETS—SHEET 1.

WITNESSES:

INVENTORS:
By their Attorneys,

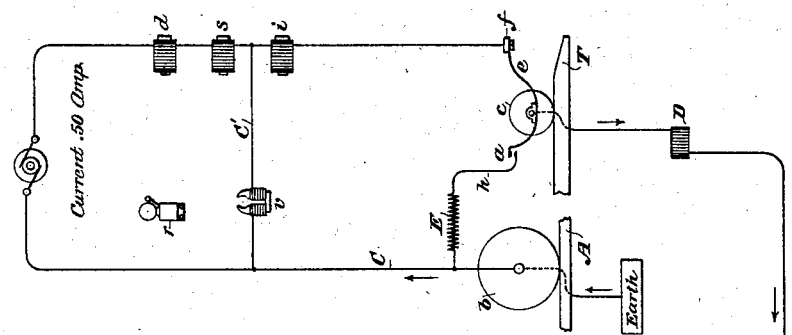
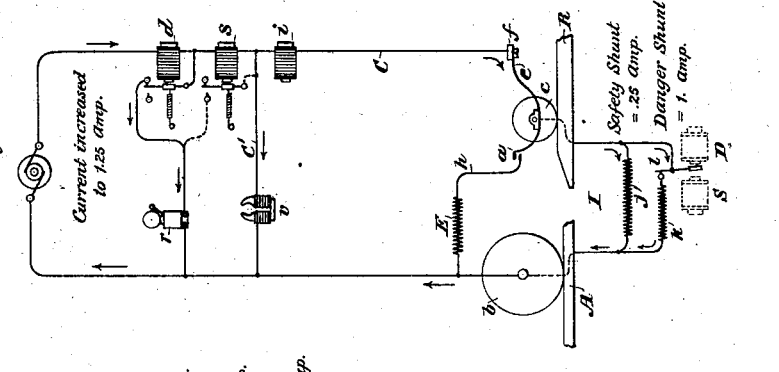
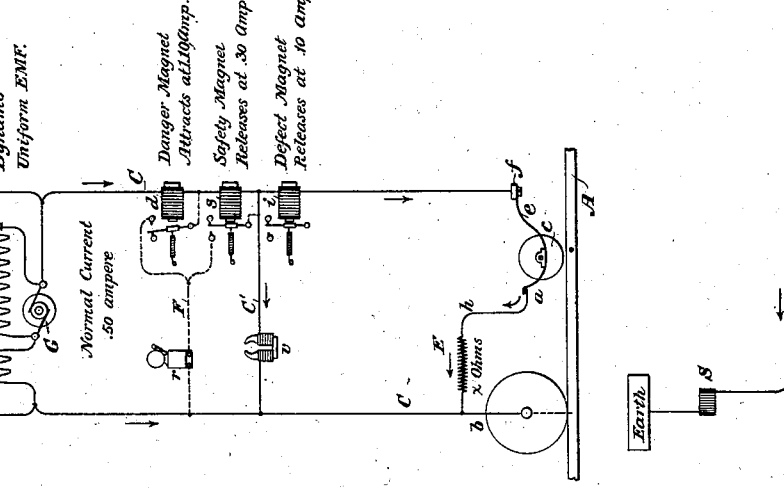

No. 721,161. PATENTED FEB. 24, 1903.
E. B. CUTTEN & A. C. FRASER.
ELECTRIC SIGNAL FOR RAILWAYS.
APPLICATION FILED FEB. 6, 1891.
NO MODEL. 4 SHEETS—SHEET 3.
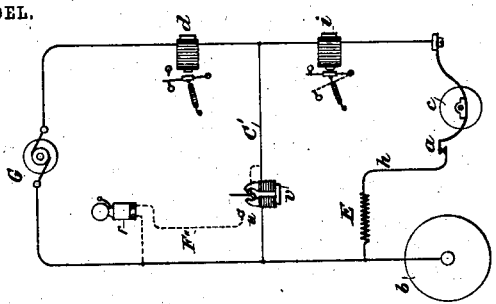
FIG. 8.
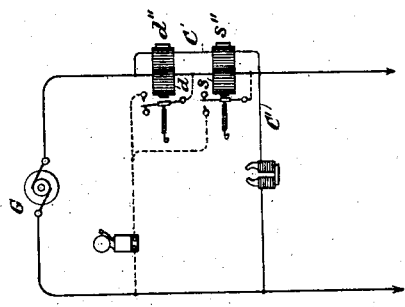
FIG. 7.
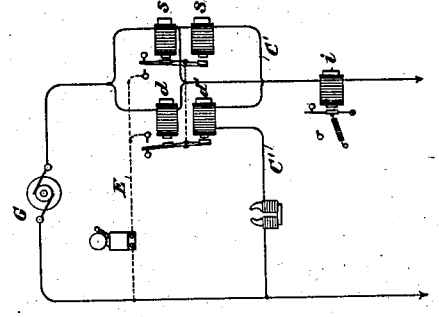
FIG. 6.
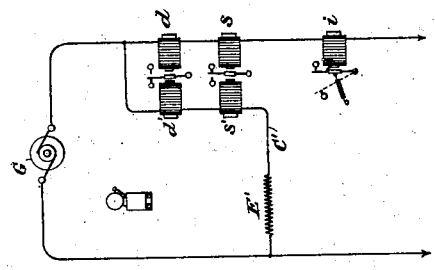
FIG. 5.
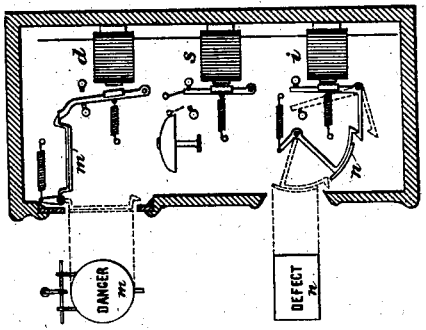
FIG. 11.
FIG. 10.
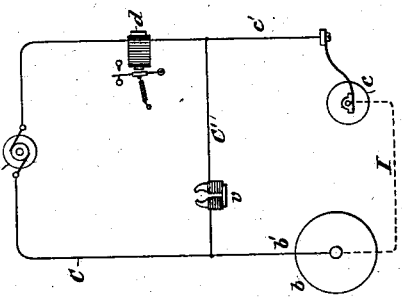
FIG. 9.
WITNESSES:
Geo. W. Breck.
C. E. Ashley
INVENTORS:
Elisha B. Cutten and
Arthur C. Fraser,
By their Attorneys,
Arthur C. Fraser & Co.

No. 721,161. PATENTED FEB. 24, 1903.
E. B. CUTTEN & A. C. FRASER.
ELECTRIC SIGNAL FOR RAILWAYS.
APPLICATION FILED FEB. 6, 1891.
NO MODEL. 4 SHEETS—SHEET 4.
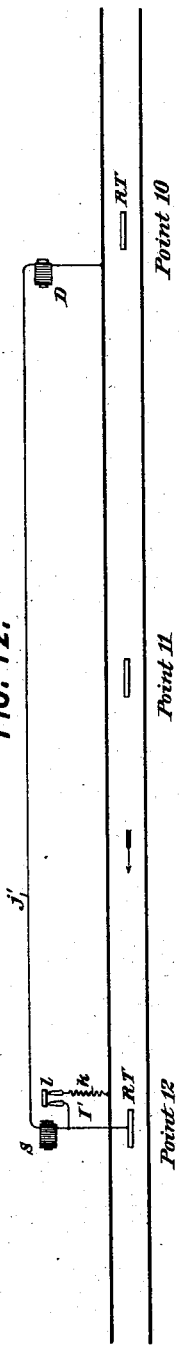
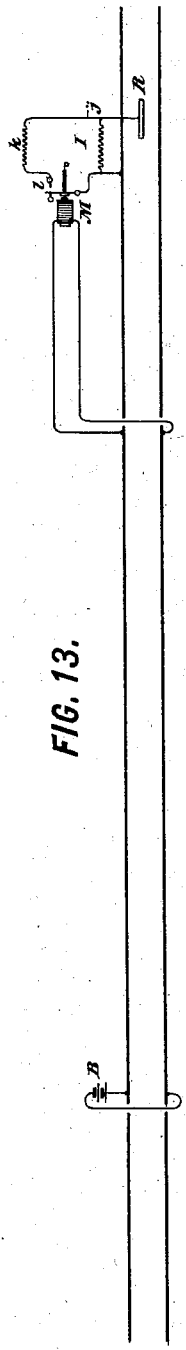
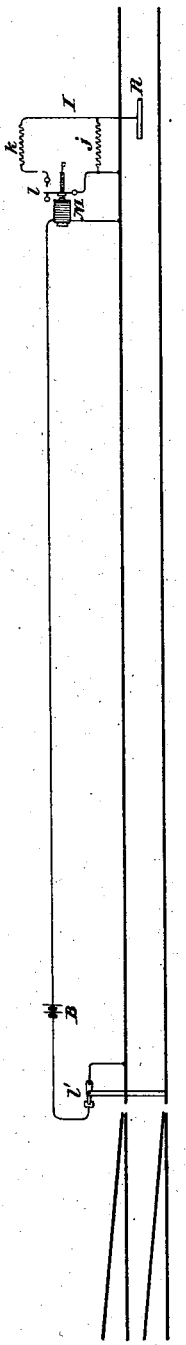
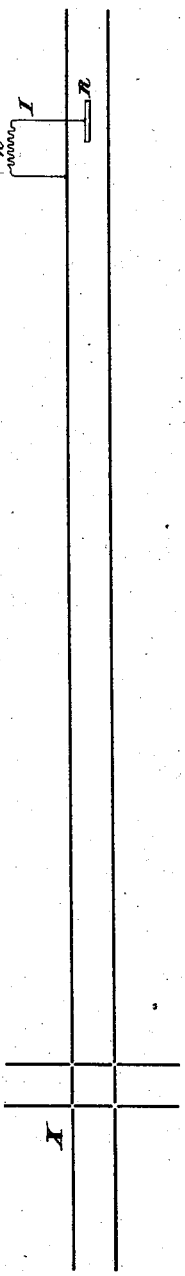
WITNESSES:
Geo. W. Breck
C. E. Ashley
INVENTORS:
Elisha B. Cutten
Arthur C. Fraser
By their Attorneys,
Arthur C. Fraser Jr & Co

UNITED STATES PATENT OFFICE.

ELISHA B. CUTTEN, OF NEW YORK, AND ARTHUR C. FRASER, OF BROOKLYN, NEW YORK, ASSIGNORS TO SAID FRASER AND GEORGE H. FRASER, OF BROOKLYN, NEW YORK.

ELECTRIC SIGNAL FOR RAILWAYS.

SPECIFICATION forming part of Letters Patent No. 721,161, dated February 24, 1903.

Application filed February 6, 1891. Serial No. 380,444. (No model.)

*To all whom it may concern:*

Be it known that we, ELISHA B. CUTTEN, residing in the city and county of New York, and ARTHUR C. FRASER, residing in the city of Brooklyn, in the county of Kings, State of New York, have invented certain new and useful Improvements in Electric Signals for Railways, of which the following is a specification.

This invention relates to that general class of electric railway-signals wherein the signal or alarm is given in the cab of a locomotive or on some other part of a moving train. Signals of this class have the obvious advantage over visual signals displayed along the track that a danger-signal is forced upon the attention of the engineer, thereby avoiding the risk inseparable from visual track-signals that an engineer may run past without seeing the signal, which is especially liable to occur during storms or fogs or at night, in case the signal-lamp goes out, or at any time whenever the engineer is inattentive through drowsiness or fatigue.

The many attempts which have heretofore been made to devise a cab-signal may be classified generally under two heads—namely, "open-circuit systems" and "closed-circuit systems."

According to the open-circuit systems the locomotive is provided with a partial or incomplete circuit or loop terminating, on the one hand, in a contact brush or device including an alarm-magnet and, on the other hand, in a ground connection, usually through the frame and wheels of the engine to the track-rails. At the points along the track where a signal is to be given the track-circuit is connected, on the one hand, with the track-rail to form a ground connection, is provided with means for breaking or closing it, and terminates, on the other hand, in a contact rail or plate to be swept or touched by the brush or other contact terminal on the locomotive. At the instant that the locomotive is passing over this contact-plate the two partial circuits are connected to form momentarily one entire circuit. The battery or other generator has sometimes been included in the partial locomotive-circuit and sometimes in the partial track-circuit. To give a danger-signal, the partial track-circuit is closed, so that upon the passing of the locomotive a current will flow for an instant over the two united circuits, thereby exciting the alarm-magnet in the cab and giving the danger-signal. When no signal is to be given, the partial track-circuit is broken. The objection to all such systems is that a defect in either the partial locomotive-circuit or the partial track-circuit will give an indication of "safety," thereby suppressing a danger-signal if the controlling instrument were set to give one. A further disadvantage of such systems is that there is no possible way of distinguishing the condition of a defect from the condition of safety, so that a circuit once defective might continue undetected for a long time until its defect was discovered by a special test made by an inspector. The unreliability of systems of this class has prevented their adoption.

The closed-circuit systems are characterized by the provision of a normally closed circuit carried by the locomotive, fed with a normally flowing current from a dynamo or other generator on the locomotive and including an alarm-magnet which normally holds its armature attracted, but upon the breaking of the circuit releases its armature, and thereby causes the alarm or danger-signal to be given. The track at each signaling-point is provided with a normally open incomplete circuit, which at the instant of passage of a locomotive is momentarily included in the locomotive-circuit by being cut or shunted thereinto serially, so that for a moment a current from the generator must flow through this partial track-circuit as well as through the locomotive-circuit, or at least the part thereof which includes the alarm-magnet. If the track-circuit is complete or unbroken, the current on being diverted over this new path is not interrupted, and the alarm-magnet continues to hold its armature attracted, so that no alarm is given; but if the partial track-circuit be broken either by accident or by the operation of a signaling instrument then the normal current is momentarily interrupted and the magnet releases its armature and gives the alarm. According to this system an accidental break or defect in either the track-circuit or locomotive-circuit causes the danger alarm or signal to be given, so that it avoids this source of unreliability of the open-circuit systems; but in practice it is found that there is a considerable leakage of current, especially during wet weather, between the contact rails or plates and the track-rails, constituting the earth connection, the effect of which is that instead of the circuit being absolutely broken in case a danger-alarm should be given it has merely introduced into it the high resistance of the path of leakage between the rails, so that instead of the current being absolutely discontinued it is more or less reduced in volume. The greater the leakage the less is the reduction of volume, and it has sometimes occurred that there was sufficient leakage to short-circuit enough current to maintain the alarm-magnet sufficiently energized to retain its armature at a time when it should release it and give the signal. Hence the tendency of any such leakage is to suppress a danger-signal when one ought to be given. This tendency unfortunately is greatest during stormy or foggy weather, so that at the time when cab-signals if reliable would have the greatest advantage they are unfortunately least to be relied upon.

Our invention seeks to overcome the disadvantages of both classes of cab-signals heretofore known and to provide a system for giving signals in the cab of a locomotive which shall be as nearly as possible absolutely reliable under all circumstances in the practical operation of a railway, wherein under no circumstances can any circuit defect or leakage tend to give a safety-signal or suppress a danger-signal, wherein, on the contrary, any leakage owing to defective insulation or to short-circuiting shall tend in proportion to its volume to give a danger-signal, and wherein a circuit break or defect shall be detected by means of a special signal in the cab, so that it shall neither indicate "safety," on the one hand, as in the open-circuit systems, nor "danger," on the other, as in the closed-circuit systems.

Our invention also provides for giving a special safety-signal indicating to the engineer as he passes each point that the track ahead is clear and that the circuits are working correctly.

The invention the subject of our present application constitutes the foundation of a new system of electric cab-signaling for railways.

Our present invention involves only that part of the system which pertains to the receiving of signals as distinguished from the transmitting of signals. In other applications for patents we shall illustrate fully novel means for operating signal-boxes or signal-setting instruments along the track for controlling the signals to be received by passing locomotives.

Our present invention employs a normally closed circuit carried by the locomotive or train fed with a normally flowing current from a dynamo or other electric generator and including one or more signaling-magnets.

Our invention is characterized generically by the augmenting of the normal current in said circuit to give a danger-signal. To this end we employ by preference an electromagnet (or other electromotive device) in said circuit which is insensible to the normal current therein, but responds to a certain increase of current, thereby attracting its armature and giving the danger-signal. In order thus to increase the current to give the danger-signal, we provide that in passing a signaling-point which is set to "danger" a branch or conducting path for the current shall be introduced into the normal locomotive-circuit in such manner as to increase the conductivity or decrease the resistance of said circuit, whereby according to well-known laws the current is proportionately augmented. The effect is the same as that of throwing into an incandescent lighting-circuit one or more additional lamps in multiple, whereby, as is well known, the total volume of the current is increased.

Our invention also provides a special defect-magnet (or equivalent electromotive device) arranged in the normally closed locomotive-circuit, so that it normally holds its armature attracted; but upon the breaking of the circuit and cessation of the current or upon the introduction of an abnormally high resistance, thereby reducing the current below a certain normal minimum, it is demagnetized or so weakened that it releases its armature, and thereby gives a special signal denoting that a defect in the circuits exists.

Our invention also provides for giving a safety-signal, if desired, by means of a special electromagnet (or equivalent electromotive device) which, like the defect-magnet, normally attracts its armature; but upon a certain reduction of the current it is sufficiently weakened to release its armature, thereby giving some special signal which will indicate to the engineer that the instruments are set to "safety." Thus at each signaling-point the engineer receives either a danger-signal, a safety-signal, or a defect-signal. To give this safety-signal, we provide for momentarily decreasing the conductivity or increasing the resistance of the normal locomotive-circuit, preferably by cutting serially thereinto a partial circuit on the track containing a sufficient resistance to reduce the current to the necessary extent for operating the safety-magnet.

The general nature of our invention being now understood, we will proceed to describe minutely the preferred means for carrying it into effect, as well as some modifications thereof, with reference to the accompanying drawings, wherein—

Figure 1 shows in dotted lines the side elevation of a locomotive and in full lines diagrammatically the circuits and electric devices incident to our invention. Fig. 2 is a diagram showing the complete electric circuits with which the locomotive is equipped under the normal condition—that is, while the locomotive is running between signaling-points, and consequently receiving no signal. Fig. 3 is a similar diagram showing the locomotive-circuits at the instant of receiving a danger-signal. Fig. 4 is a similar diagram showing the locomotive-circuits at the instant of transmitting a signal or impulse over the line-circuit in order to set the signal in the rear for the next following train or for signaling in advance. Figs. 5, 6, 7, 8, and 9 are diagrams of the locomotive-circuits, showing different arrangements and modifications, which will be fully described hereinafter. Fig. 10 is a sectional side elevation showing one suitable construction of the signal-receiving instruments in the locomotive for giving visual and audible signals to the engineer. Fig. 11 is a fragmentary transverse section of a railroad-track, showing diagrammatically the circuit connections for a modified form of our invention. Figs. 12, 13, 14, and 15 are diagrammatic views showing railway-tracks and instruments in connection therewith for giving the danger or safety signals to a passing locomotive.

Throughout the drawings the letter G designates an electric generator, preferably a dynamo-electric machine, although a battery might be used. This dynamo is indicated diagrammatically in most of the figures, its complete connections being shown only in Fig. 2.

C designates the normally closed locomotive-circuit fed by this dynamo and including either in series or derivation the coils of the magnets $d$, $s$, and $i$. Of these, $d$ is the danger-magnet, $s$ the safety-magnet, and $i$ the defect-magnet. They are shown arranged in series in all the figures except Fig. 6, where the magnets $d$ and $s$ are in derivation. The magnets $d$ and $s$ are shown as provided with retracting-springs for their armatures in Figs. 2, 7, 8, 9, and 10, while in Figs. 1, 5, and 6 they are provided with retractile magnets, (lettered $d'$ and $s'$, respectively.)

The normally closed circuit C is provided with a circuit-breaker $a$ at some convenient point, and on opposite sides of the circuit-breaker the circuit is connected, on the one hand, by what we will call a "ground" connection $b$ and, on the other hand, with a contact device $c$. The ground connection $b$ is preferably a connection with the iron frame of the locomotive and thence through the wheels thereof to the track-rails A. The contact device consists, preferably, of a metallic wheel $c$, mounted on a spring-arm $e$, connected to some part of the frame of the locomotive or tender at $f$. The circuit-breaker $a$ is operated by the displacement of the contact-wheel $c$, so that whenever this wheel is displaced upwardly the circuit C shall be broken, as shown in Figs. 3 and 4.

On or adjacent to the track contact-rails are laid at the signaling-points. These rails may be either for receiving a signal or for transmitting. The receiving-rails are lettered R and the transmitting-rails T. Ordinarily for block-signaling two of these rails will be laid in immediate succession, as shown in Fig. 1, or by a further improvement in the system a single rail may be employed for both receiving and transmitting, as shown at R T in Fig. 12. The means for effecting block-signaling will be fully set forth in a separate application for patent. The contact-rails are formed at their ends with rising and falling inclines and are arranged to be encountered by the contact-wheel $c$, which will roll up the rising incline, will roll along the level top of the rail or rails, and will roll down the falling incline. During this interval the normal circuit is broken at $a$, but is put into communication through the contact-wheel $c$ with the contact-rail R or T.

At each signal-receiving point the rail R is connected to one terminal of a partial track-circuit I. (Shown in Figs. 3, 12, 13, 14, and 15.) This receiving-circuit terminates on the one hand in the rail R and on the other in a ground connection, preferably by being connected with one of the track-rails A, as shown. This partial circuit is preferably divided into two branches or shunts—a safety-shunt $j$ of comparatively high resistance and a danger-shunt $k$ of comparatively low resistance. The safety-shunt $j$ is preferably always closed, while the danger-shunt is provided with a circuit-breaker $l$, so that it may be cut out of circuit for "safety" and cut into circuit for "danger." The circuit-breaker $l$ may be operated by a relay or any other suitable means, either mechanical or electrical. It is shown in Fig. 3 as being operated by a double relay, consisting of a danger-magnet D for setting it to "danger" and a safety-magnet S for setting it to "safety." In Figs. 13 and 14 it is shown as operated by a single relay-magnet M, which while excited by the current from a battery B holds the danger-shunt $k$ broken, but if demagnetized releases its armature and permits the retractile spring thereof to close the danger-shunt. Our invention has no reference whatever to the means by which this circuit-breaker may be operated to set the receiving-point to "danger" or "safety," numerous means for this purpose being already known in the art. The circuit-breaker $l$ may, for example, be operated by hand in case a trackman finds it necessary to signal to an approaching train.

At each signal-transmitting point the contact-rail T is connected with one terminal of the line-circuit, as shown in Fig. 4. This circuit will include any necessary magnets for operating signal-setting instruments at any point along the line in the rear or in advance. Two magnets D and S are shown in Fig. 4 in this circuit, which may be the magnets of a double-acting circuit-breaking relay of the character shown in Fig. 3 or of any other kind of instrument. The ground-circuit terminates on the one hand in the contact-rail T and on the other in an earth connection, which may be made by connecting it directly to the track-rail A or to an earth-plate, as shown in Fig. 4, or otherwise. In Fig. 4 this line is shown as grounded in an earth-plate, and the rail A is also grounded in an earth-plate, so that a current sent over the line from the rail T returns to the rail A.

In the portion $h$ of the normally closed circuit C, which is between the circuit-breaker $a$ and the ground connection $b$ and which consequently is cut out by the operation of the circuit-breaker, we preferably introduce a rheostat or resistance E, the resistance $x$ of which preferably equals that of the line-circuit, as shown by a comparison of Figs. 2 and 4. It results that when in transmitting the resistance E is cut out and the line resistance is cut in the current in the normal circuit C is not affected. This feature, however, is not essential to our invention.

The operation may now be understood. The dynamo G is constructed to generate a uniform electromotive force, so that with a fixed resistance in the circuit C the current traversing this circuit and influencing the magnets therein remains uniform. Let us assume this normal current to be one-half an ampere, as indicated in Fig. 2. The retracting-spring of the danger-magnet $d$ is adjusted to sufficient strength to hold its armature retracted against the pull of the magnet when energized by this current; but an increase of the current to, for example, one and one-tenth amperes will cause it to attract its armature. The retracting-spring of the safety-magnet $s$ is so adjusted that the normal current in this magnet holds its armature attracted, but releases it under the tension of the retracting-spring at, for example, three-tenths of an ampere. The retracting-spring of the defect-magnet $i$ is still weaker, so that this magnet will hold its armature attracted not only at the normal current, but until this current falls as low, for example, as one-tenth of an ampere, at which point this spring will draw off its armature. The current which permits this magnet to release its armature should be so low a current as to indicate a defect in the circuits. The conductivity of the receiving-circuit I should necessarily be proportioned relatively to the adjustment of the magnets. Thus, referring to Fig. 3, the safety-shunt $j$ has a conductivity such that when this shunt alone is cut into the circuit C and the branch $h$ cut out the resistance of the whole circuit will be such as to reduce the current sufficiently below the normal to cause the safety-magnet to release its armature—that is to say, it must be reduced to three-tenths of an ampere or somewhat below. In Fig. 3 it is shown as reducing it to one-quarter of an ampere. To effect this, if the resistance E is used the resistance of the shunt $j$ should be considerably higher. Consequently whenever the receiving position (shown in Fig. 3) is reached and the shunt $k$ is broken the shunt $j$ will so reduce the current as to cause the safety-magnet to drop its armature, thus indicating to the engineer that the line is clear in advance and he can proceed with confidence; but if the danger-shunt $k$ is closed then instead of the normal current being reduced it will be increased, and increased sufficiently to cause the magnet $d$ to attract its armature and give the danger-alarm. To this end with the proportions shown the conductivity of this shunt should be such as to permit the flow, for example, of one ampere, thereby increasing the total current to one and one-quarter amperes, as shown in Fig. 3, so that as the danger-magnet attracts its armature at one and one-tenth amperes its operation will be made certain. For greater certainty this margin may be further increased, if desired, the proportions given throughout being merely by way of illustration or suggestion and not as an exact indication of the proportions essential to our invention, which may be varied within wide limits, according to the varying judgment of electrical engineers who may apply the system under different conditions.

We would remark that although the giving of a safety-signal by the magnet $s$ is a desirable feature of our invention it is by no means indispensable. Whether this magnet will be used or not will depend upon whether in any particular case the railroad officials desire that the engineer shall receive a safety-signal at each point where safety exists. When this is not desired, the magnet $s$ will be omitted, as shown in Figs. 1 and 8, and the safety-shunt $j$, if used, will have its resistance reduced, so as to exactly balance the resistance E, which is cut out as it is cut in. In such case in passing over the receiving-point the current will not be affected, so that the absence of a signal will be evidence of safety.

It is obvious that if the circuit I between the safety-shunt $j$ and either rail R or A, Fig. 3, should be broken or if the line-circuit, Fig. 4, should be broken at any point the circuit C will be broken at such point as well as at the circuit-breaker $a$, and consequently the current in this circuit will cease if the break be an absolute one or will be very greatly reduced if instead of a break there be merely an imperfection in the line introducing a high resistance sufficient to reduce the current to below (in the example given) one-tenth ampere, so that the defect-magnet releases its armature and gives the defect-signal. Preferably its armature when released falls off so far that if the normal current were to be immediately after resumed the defect-magnet would not be able to attract its armature, the latter being being beyond its attractive range. This is indicated in Figs. 1 and 5.

The various signals may be given in the cab either audibly or visually. An audible signal may be given by the ringing of a bell or by the blowing of a whistle, both of which are well known in the art. A visual signal will be given ordinarily by the movement of a drop into view. In Figs. 1 to 7 we have shown means for giving the danger-alarm or safety-signal by the ringing of an electric bell, preferably a rheotomic bell, as shown at $r$. This bell is connected in a normally open shunt or derived circuit F. (Shown in dotted lines in Figs. 1, 2, 6, and 7 and in full lines in Fig. 3, where it is closed and being traversed by a current in giving the danger-alarm.) The magnets $d$ and $s$ constitute relays which close the bell-circuit upon their operation by the connection of the terminals of the bell-circuit to the armature-levers of these magnets and their contact-stops in a manner well understood. The construction is such, preferably, that when a danger-alarm sounds the bell will continue to ring until the engineer stops it, while the safety-alarm will consist merely of a single stroke or a momentary ringing of the bell. To effect these results, we adopt the circuit arrangements shown in Figs. 2 and 3. The bell-circuit F is divided into two branches, one of which is closed by the armature of the danger-magnet and the other by that of the safety-magnet. The branch closed by the danger-magnet includes the coil of this magnet, so that not only does this coil add to the resistance of the bell-circuit in order to prevent too heavy a current traversing this circuit, but by the additional current which thus flows through the bell-circuit being caused to traverse the coils of the magnet $d$ its attraction is further increased, so that it tends to hold its armature attracted even though the momentary increase of current which caused it to first act may have ceased by the passage of the contact device $c$ beyond the receiving contact-rail R. Consequently the bell will continue to ring until the engineer pulls the armature of the danger-magnet off therefrom, for which purpose a suitable handle or cord will be provided. The other branch of the bell-circuit F, which traverses the armature of the safety-magnet, is connected to the main circuit beneath this magnet, so that the current traversing this branch necessarily traverses first serially the coils of the two magnets $d$ and $s$, the resistance of which reduces the current which can act upon the bell, so that the bell will ring less energetically for a safety-signal than for a danger-signal, so that even if it were to ring continuously the engineer could readily detect by the ear alone whether the signal was for "safety" or for "danger;" but upon the dropping off of the armature of the safety-magnet to close this bell-circuit the additional current thereby directed through the coils of the safety-magnet will increase its attraction sufficiently, so that with suitable adjustment it will have power to reattract its armature, thereby instantly breaking the bell-circuit, so that the ringing of the bell will have been merely momentary. By reason of the increased resistance in this branch the increase of current thus passing through the coils of the two magnets is not sufficient to increase the energy of the danger-magnet sufficiently to cause it also to attract its armature.

The defect-magnet might be caused to ring the same bell $r$ to indicate a circuit defect; but it is preferable to provide this magnet with some means of giving the signal which is entirely independent of the source of energy furnished by the dynamo, because it is one function of this magnet to indicate a defect in the dynamo by which it fails to furnish the proper current or in the normal locomotive-circuit, and such defects might deprive the bell of the source of energy to ring it, so that the fact that the defect-magnet had operated would fail to be noticed. For this reason we prefer to provide some entirely distinct audible signal—such, for example, as a clockwork-bell—to be released by the defect-magnet or to cause it to operate a drop carrying the word "Defect," as shown at $n$ in Fig. 10, or other suitable indication. It is also desirable that the magnet $d$ shall operate a drop, which may be done in the manner shown in Fig. 10, where a disk $m$, tending to fall into view, is normally restrained by the armature-lever; but upon the attraction of the armature it falls to the position shown in dotted lines, where it will remain until restored or pushed up by the engineer. In this figure we show the safety-magnet $s$ as adapted to strike a single blow against a gong each time it releases its armature, its adjustment being such that it will automatically reattract its armature upon the resumption of the normal current.

The dynamo G should, as stated, generate a uniform electromotive force. To effect this, its field-magnet should be wound with a compound winding, as denoted in Fig. 2, and the speed at which the dynamo is driven should be governed automatically to maintain the requisite electromotive force. To accomplish this, we provide an electromagnetic governor consisting of a magnet or solenoid H, connected in a shunt $g$ between the dynamo-terminals, so that the excitation of this magnet will vary with any variation in the electromotive force, and we cause the armature of this magnet to act through a lever $p$ on the throttle-valve $q$, governing the admission of steam from the boiler to the little engine or steam-motor by which the armature of the dynamo is driven, so that upon any fall of potential the magnet will open the valve and admit more steam to drive the dynamo faster, and vice versa. By these means the electromotive force is kept substantially uniform, the margin of variation being too slight to influence the respective magnets. In case, however, the dynamo is not governed to within the requisite margin of variation of electromotive force or in any case when the variations of electromotive force are such as might interfere with the correct working of the danger and safety magnets we provide for compensating for the variations in electromotive force by introducing retractile means for the armatures of the magnets which shall exert a retractile force varying in the same proportion. Such means will consist of retractile magnets, as shown in Figs. 1, 5, 6, and 7, that for the danger-magnet being lettered $d'$ and that for the safety-magnet being lettered $s'$. These magnets are connected in a shunt-circuit $C'$ between the main conductors, so that the current through the coils of these magnets will vary proportionally to the variations of electromotive force. The retractile magnets may be arranged opposite the danger and safety magnets, as shown in Fig. 5, to pull against the same armatures, or the armature-levers may be provided with two armatures and their respective magnets be arranged side by side, as shown in Fig. 6, or instead of distinct retractile magnets the magnets $d$ and $s$ may be wound with additional compensating coils $d''$ and $s''$, respectively, as shown in Fig. 7, which will be wound oppositely to the main coils of the magnets, so as to reduce their magnetism in case of an increase of current to the same extent that such increase would tend otherwise to increase their magnetization, thereby neutralizing the effect of any such variations.

The shunt-circuit $C'$ is preferably connected to include also the coils of the magnets $d\ s$, as thereby the resistance of these coils is availed of to suitably reduce the current flowing through the shunt-circuit, or an especial resistance $E'$ may be introduced instead, or the coils $d'\ s'$ may be made of sufficiently-high resistance.

It is desirable that the engineer should be able to know at any moment the exact electromotive force that the dynamo is generating. For this purpose we provide, by preference, a voltmeter $v$. (Shown best in Fig. 1.) This may be of any suitable construction and is preferably constructed so that upon the fall of potential to a minimum voltage it shall close the circuit of the alarm-bell, so as to attract the attention of the engineer. For this purpose we provide a contact-stop $u$ to be touched by the needle or other moving part of the voltmeter in the position of minimum current, the needle and stop constituting a circuit-closer connected in a branch $F'$ of the bell-circuit. The coils of the current-meter are connected in any suitable shunt, either in a direct shunt between the dynamo-terminals, as shown in Fig. 1, where it serves as a true voltmeter, or in the shunt-circuit $C'$, as shown in Fig. 2, where it is in series with the signal-magnets $d s$, and consequently indicates the current traversing them, but is out of the main circuit, so that its coils are not traversed by the augmented current in receiving a danger-signal. This arrangement renders it inaccurate for the instant that the locomotive is passing over a contact-rail; but otherwise it gives a correct indication of the condition of the circuit traversing these magnets.

When the shunt-circuit $C'$ is employed, the defect-magnet $i$ is preferably arranged entirely outside of this circuit, as shown, because if it were included in the circuit $C'$ it would be traversed by the current therein, which is never interrupted except by an accidental defect in the circuit or by the derangement or stoppage of the dynamo. The defect-magnet might, however, be included in this circuit, if preferred, provided that it were at the same time included in the normal circuit C; but as it is designed to respond only to defects in the circuit C its adjustment must be such that the current peculiar to the circuit $C'$ will not alone be sufficient to hold its armature attracted.

While the employment of the circuit-breaker $a$ is desirable in connection with our present invention, it is by no means essential thereto. Fig. 9 shows a modified arrangement that may be employed. The normally closed circuit C is completed through the shunt $C'$ or by any other means in order to maintain a continuous current through the danger-magnet $d$. The circuit is provided with a ground connection or branch $b$ on the one hand and a branch or connection $c'$ on the other, leading to the contact-wheel $c$, which in this case is a mere contacting device and might be substituted by any suitable brush or rubbing contact. With the circuits thus arranged the magnet $d$ is not affected by the normal current through the circuit C C', nor is it affected by the current due to the additional conductivity of the line-circuit in the position shown in Fig. 4, which increases the current in the circuit C C' to an extent insufficient to enable the magnet $d$ to attract its armature; but in the position shown in Fig. 3 the current is so considerably increased by the additional conductivity of the danger-shunt $j$ of the receiving-circuit I, which is of relatively low resistance, that the magnet $d$ is caused to attract its armature and give the alarm. This receiving-circuit may be an absolute short circuit, as denoted by the dotted lines in Fig. 9. This modification precludes the reduction of the current in the circuit C C' below its normal, so that the safety-magnet $s$ is omitted. The defect-magnet $i$ is also omitted, because if introduced in the circuit C C' it would not give any indication of the condition of the external circuits, and the condition of the circuit C C' may be sufficiently indicated by the voltmeter $v$, which may itself be considered a defect-magnet, since its pointer or armature drops off or is relaxed as the current is reduced, and a certain extent of retraction may correspond to such a reduction or cessation of the current as would indicate a defect.

We have referred to one of the terminal branches from the circuit C as being carried to a ground connection, preferably through the wheels of the locomotive, to the track-rails. By the expression "ground connection" thus used, however, we do not limit ourselves to the connection being made, necessarily, through the ground, or even through the track-rails, as it might be made quite independently of either the ground or rails. By "ground connection" we mean any connection by means of which a current sent through the contact device $c$ may be returned by a branch $b$ or $b'$ to the locomotive-circuit. As an example of and equivalent for the ground connection we have introduced the illustration in Fig. 11, which shows two contact-wheels $c$ and $c^2$, the former connecting by a branch $c'$ with one part of the normal circuit C and the latter constituting the ground connection and communicating by a branch $b^2$ with the normal circuit. This arrangement requires two contact-rails R and $R^2$, which constitute the opposite terminals of the track-circuit I, which in the example shown contains only one branch, broken at its circuit-closer $l$ for safety and closed to conduct a current from one contact-wheel to the other to augment the normal current through the danger-magnet $d$ to give the danger-alarm.

Fig. 12 shows one of the tracks of a double-track railway divided up for block-signaling by points 10 11 12, &c. At each point is laid a single contact-rail R T, which serves simultaneously for both receiving and transmitting. For transmitting it is connected to one terminal of the line-circuit $j'$, which leads back to the point 10 or to any other suitable place, where its end is grounded. For receiving, a branch circuit or receiving-circuit I' is provided, including a resistance $k$ and a circuit-breaker $l$, the latter in this instance being shown as constructed with two contact-brushes to be bridged by a contact-plate to close the circuit. When the signaling-point is set to "safety," this circuit I' is broken, as shown, and the current from the locomotive passes only over the line $j'$, the resistance of which is so high that the additional current thrown into the locomotive-circuit is not sufficient to act upon the danger-magnet $d$, (see Figs. 9 or 11,) or in case the circuit-breaker $a$ and resistance E are employed then the resistance of this line may be made equal to the resistance E, so that the inclusion of the line will not affect the locomotive-circuit, or if the safety-magnet $s$ is used then the resistance of the line $j'$ may be made equal to that of the safety-shunt $j$ in Fig. 3, so that at the instant of passing the point the current in the locomotive-circuit will be so reduced as to actuate the safety-magnet. Thus the transmitting-line $j'$ constitutes an equivalent of the permanently-closed safety-shunt $j$ of the receiving-circuit, (shown in Fig. 3;) but if the point be set to "danger" the receiving branch I' will be closed, and as this branch has much greater conductivity than that of the line it will carry a sufficiently-increased current to act upon the danger-magnet $d$ and give the alarm in the cab.

Fig. 13 illustrates how our invention may be adapted to an existing well-known system for block-signaling, wherein the track-rails are made a part of a circuit comprising a battery B at one end and a relay M at the other, so that if the rails be short-circuited by the presence of the wheels and axles of a train or any part thereof the relay will be demagnetized and release its armature. Our invention enables the dropping of the relay thus to the danger position to give a danger-signal in the cab of a passing locomotive, whereas heretofore this system of signaling has been useful only to operate visual signals alongside the track.

Fig. 14 shows an application of our invention to give warning in case a switch is misplaced. The circuit-breaker $l'$, operated by the switch, is connected in a normally-closed circuit fed by a battery B and operating a relay M, so that upon the opening of the switch the circuit is broken and the relay drops off, its armature thereby closing the danger-shunt $k$ of the receiving-circuit.

Fig. 15 shows a signaling-point set to give permanently a signal of danger to each passing locomotive. This is done by a circuit I, containing a suitable resistance $k$, and extending from one of the track-rails to the receiving-rail R, having such conductivity that the current which will be diverted through it will augment the normal current sufficiently to cause the danger-magnet to act. Such a permanent danger-signal will be useful in some instances—as, for example, in the case of a grade-crossing, as shown at X. In some States and on some railroads the regulation prevails that all trains shall come to a dead-stop before crossing another track, and in such cases this permanent danger-signal may be advantageously introduced at a sufficient distance from the crossing to give the engineer warning and enable him to stop.

It will be clear from the foregoing description that any defect in the track-circuits will tend to give upon the locomotive either a danger-signal or a defect-signal. No defect within the range of practical probability or, in other words, nothing short of such tampering with the signals, as only a skilled electrician thoroughly understanding the system could effect, will serve to give a safety-signal or (in the absence of a safety-magnet) to suppress a danger-signal. The two defects which are most likely to occur in track-circuits and which practically may be considered the sole defects to which such circuits are liable are short-circuiting or leakage and breaking of the circuit. A short circuit, as denoted by the dotted line in Fig. 9, for example, will cause a large augmentation of current and inevitably give the danger-alarm. Any leakage such as might prevail on the track in wet weather will to the extent of the leakage augment the current and consequently will tend to give a danger-signal. The adjustments will in practice be such that the largest possible normal leakage in any weather will be insufficient of itself to cause the danger-alarm to be given; but any abnormal leakage, such as might result from a short circuit or such as would indicate a defective circuit arrangement, will so increase the current as to give the danger-alarm. On the other hand, the breaking of the circuit or even such an impairment of the connections as would amount to an inordinately high resistance will with the construction shown in Figs. 1 to 8 give the defect-signal. If the defect-drop falls, it will be the engineer's duty to immediately restore it, and if it remains up he will know that the defect was only momentary and will consequently know that it existed in the track-circuit he has just passed; but if he cannot restore it it will indicate that the defect is a continuous one and must exist in the locomotive-circuits.

Obviously our invention may be modified in various ways which will be obvious to electricians. For example, the signaling-magnets need not be actually included in the normal locomotive-circuit, but may be so arranged as to be controlled or influenced thereby—as, for example, by inductive means, such as are well known in the art. We therefore desire it to be well understood that we do not limit ourselves to the exact means shown, but consider that our invention necessarily includes all modifications and equivalents of any of the means we have herein illustrated and described.

As an example of a modification of or equivalent for the danger-magnet wherein it is not placed in the main circuit and does not indicate a danger-signal by increasing its attraction for its armature we would mention that the voltmeter or current-meter $v$, hereinbefore referred to, may be utilized to give the danger-signal. To effect this, it should be included, in the manner shown in Fig. 8, in a shunt $C'$, so as to include in the shunted circuit a resistance in one of the main conductors. This resistance is represented by the coil of the magnet $d$ in Fig. 8. Upon throwing into circuit the increased conductivity of the danger-shunt of the receiving-circuit I the lowering of potential between the terminals of the shunt-circuit $C'$ will cause the current-meter $v$ to relax its armature, so that the latter will make contact with the stop $u'$, Fig. 8, and thereby close a branch circuit $F'''$, which includes the bell $r$, thereby ringing this bell to give the danger-alarm. We mention this as a possible means for giving the danger-signal, which, like many other modifications, is within the spirit of our invention.

We claim as our invention the following-defined novel features, substantially as hereinbefore specified, namely:

1. In an electric railway signal system, a normally closed circuit carried by the locomotive and fed by a generator, with a predetermined normal current combined with a danger-magnet in connection with said circuit, uninfluenced by the normal current therein but responding to a certain increase of current to give the danger-signal.

2. In an electric railway signal system, a normally closed circuit carried by the locomotive and fed by a generator, combined with a signal-magnet and a defect-magnet in connection with said circuit, the signal-magnet adapted to respond to a predetermined change in the current, and the defect-magnet adapted to respond to an extreme reduction or cessation of current.

3. In an electric railway signal system, a normally closed circuit carried by the locomotive and fed by a generator, combined with separate danger and defect magnets in connection with said circuit, influenced by different abnormal conditions of the current to give respectively danger and defect signals.

4. In an electric railway signal system, a normally closed circuit carried by the locomotive and fed by a generator, a danger-magnet in connection with said circuit, uninfluenced by the normal current therein but responding to a certain increase of current to give the danger-signal, and said circuit having connections on the one hand with a contact device and on the other with a ground connection, in combination with a receiving track-circuit terminating on the one hand in a contact-rail to make an electric connection with said contact device and on the other in a ground connection, and having a conductivity sufficient to cause such an increase of the current in the normal locomotive-circuit as will actuate the danger-magnet.

5. In an electric railway signal system, a normally closed circuit carried by the locomotive and fed by a generator, a danger-magnet in connection with said circuit responding only to a certain increase above the normal current, and said circuit having contact and ground connections, in combination with a receiving track-circuit terminating on the one hand in a contact-rail and on the other in a ground connection, and said circuit provided with a circuit-breaker and constructed in one condition to afford a high conductivity and thereby augment the current in the locomotive-circuit to give a danger-signal, and in another condition to afford so low a conductivity as to avoid a sufficient increase in the current in said circuit to give such signal.

6. The combination with a normally closed locomotive-circuit fed by a generator and including a danger-magnet, of a track receiving-circuit constructed to be momentarily connected with a locomotive-circuit during the passage of the locomotive and comprising a permanently-closed safety branch or shunt of a conductivity too low to cause the danger-alarm to be given, and a danger branch or shunt provided with means for opening or closing it and having a conductivity sufficient to so increase the normal current on the locomotive as to give the danger-signal, whereby by closing such danger-shunt the danger-signal is caused to be given to a passing locomotive.

7. A line or transmitting circuit along a railway terminating on the one hand in a contact-rail and on the other in a ground connection, in combination with a normally closed circuit carried by a locomotive and fed by a generator including a danger-magnet insensible to the normal current therein but responding to a certain increase of current, a circuit-breaking contact device adapted to connect the locomotive-circuit with said contact-rail and thereby cut the line-circuit into said locomotive-circuit, and a resistance in the part of the locomotive-circuit cut out by said circuit-breaker, whereby said resistance is cut out of the locomotive-circuit simultaneously with the cutting in of the line resistance and the increase of current which would otherwise result from the introduction of the line conductivity is avoided or reduced, and the consequent tendency to give a danger-signal on the locomotive at the instant of transmitting a signal over the line is overcome.

8. In an electric railway signal system, a track-circuit having a permanently-closed safety-shunt of high resistance and a danger-shunt of low resistance provided with means for opening or closing it, in combination with a normally closed circuit carried by a locomotive and fed by a generator, a safety-magnet in connection therewith responding to a certain reduction of the normal current, a circuit-breaking contact device adapted to connect the locomotive-circuit momentarily with said track-circuit, and a resistance in the portion of the locomotive-circuit cut out by said circuit-breaker lower than the resistance of said safety-shunt, whereby by the cutting out of said resistance and the cutting in of the safety-shunt alone in said track-circuit the total resistance of the locomotive-circuit is so increased as to cause said magnet to act and give a safety-signal, but if the danger-shunt be also in circuit, the additional conductivity of the track-circuit maintains a sufficient current to prevent the action of the safety-magnet.

9. The combination on a locomotive of a normally closed circuit fed by a generator and including a danger-magnet insensible to the normal current but adapted to attract its armature upon a certain increase in the current, with a rheotomic bell in a shunt-circuit including the armature-lever and contact of said magnet and traversing the coils thereof, whereby when said magnet attracts its armature it closes the bell-circuit, and the current diverted therethrough by traversing also the coils of the danger-magnet, sufficiently increases its attraction to enable it to maintain its armature attracted even though the current in said normally closed circuit may have fallen to the normal, so that the bell will continue to ring until manually stopped.

10. The combination on a locomotive of a normally closed circuit fed by a generator and including a safety-magnet insensible to the normal current in said circuit but releasing its armature upon a certain decrease of current, with a rheotomic bell in a shunt-circuit including the armature-lever and stop of said magnet to be closed upon the retraction of the armature thereof and including also the coil of said magnet, whereby upon the retraction of the armature the current flowing over said bell-circuit traverses also the coils of said magnet and energizes it sufficiently to cause it to reattract its armature, thereby arresting the bell after a merely instantaneous ringing.

In witness whereof we have hereunto signed our names in the presence of two subscribing witnesses.

ELISHA B. CUTTEN.
ARTHUR C. FRASER.

Witnesses:
GEORGE H. FRASER,
CHARLES K. FRASER.